(12) United States Patent
Toshiyoshi et al.

(10) Patent No.: US 11,552,579 B2
(45) Date of Patent: Jan. 10, 2023

(54) VIBRATIONAL ENERGY HARVESTER ELEMENT

(71) Applicants: The University of Tokyo, Tokyo (JP); Saginomiya Seisakusho, Inc., Tokyo (JP)

(72) Inventors: Hiroshi Toshiyoshi, Tokyo (JP); Hiroyuki Fujita, Tokyo (JP); Hisayuki Ashizawa, Sayama (JP); Hiroyuki Mitsuya, Sayama (JP); Kazunori Ishibashi, Sayama (JP)

(73) Assignees: The University of Tokyo, Tokyo (JP); Saginomiya Seisakusho, Inc., Tokyo (JP)

( * ) Notice: Subject to any disclaimer, the term of this patent is extended or adjusted under 35 U.S.C. 154(b) by 897 days.

(21) Appl. No.: 16/464,610

(22) PCT Filed: Nov. 13, 2017

(86) PCT No.: PCT/JP2017/040800
§ 371 (c)(1),
(2) Date: May 28, 2019

(87) PCT Pub. No.: WO2018/101017
PCT Pub. Date: Jun. 7, 2018

(65) Prior Publication Data
US 2021/0119556 A1  Apr. 22, 2021

(30) Foreign Application Priority Data
Nov. 29, 2016  (JP) .............................. JP2016-231879

(51) Int. Cl.
*H02N 2/18*  (2006.01)
*H01G 7/02*  (2006.01)
*H02N 1/08*  (2006.01)

(52) U.S. Cl.
CPC ............... *H02N 2/188* (2013.01); *H01G 7/02* (2013.01); *H02N 1/08* (2013.01)

(58) Field of Classification Search
CPC ............. H02N 2/188; H02N 1/08; H01G 7/02
(Continued)

(56) References Cited

U.S. PATENT DOCUMENTS 9,190,936 B2 * 11/2015 Naito ........................ H02N 1/00
10,848,079 B2 * 11/2020 Ma ............................ H02N 1/08
(Continued)

FOREIGN PATENT DOCUMENTS

| EP | 3 244 527 A1 | 11/2017 |
| JP | 2011-87384 A | 4/2011 |

(Continued)

OTHER PUBLICATIONS

Japanese-language Office Action issued in Japanese Application No. 2021-016368 dated Nov. 30, 2021 with English translation (eight (8) pages).

(Continued)

*Primary Examiner* — John K Kim
(74) *Attorney, Agent, or Firm* — Crowell & Moring LLP (57) ABSTRACT

A vibrational energy harvester element includes: a first electrode; a second electrode that moves in a predetermined direction with respect to the first electrode; a third electrode; a fourth electrode that moves in the predetermined direction with respect to the third electrode; and a support portion that supports the second electrode and the fourth electrode so that they are movable along the predetermined direction; and wherein: the first electrode and the third electrode are disposed along the predetermined direction; at least one of facing surfaces of the first electrode and the second electrode, and at least one of facing surfaces of the third electrode and the fourth electrode, are electrically charged;

(Continued)

and the support portion supports the second electrode and the fourth electrode in a state in which electrostatic force between the first electrode and the second electrode, and electrostatic force between the third electrode and the fourth electrode are balanced along the predetermined direction.

2 Claims, 6 Drawing Sheets

(58) Field of Classification Search
  USPC .......................................................... 310/339
  See application file for complete search history.

(56) References Cited

U.S. PATENT DOCUMENTS

| | | |
|---|---|---|
| 2006/0201249 A1 | 9/2006 | Horning et al. |
| 2016/0204716 A1 | 7/2016 | Suzuki et al. |
| 2018/0041140 A1 | 2/2018 | Fujita et al. |
| 2019/0044459 A1* | 2/2019 | Degertekin ............. H02J 50/15 |
| 2019/0058420 A1 | 2/2019 | Toshiyoshi et al. |
| 2019/0386584 A1* | 12/2019 | Thibado ............. H01M 10/052 |
| 2021/0119556 A1* | 4/2021 | Toshiyoshi ............... H02N 1/08 |

FOREIGN PATENT DOCUMENTS

| | | |
|---|---|---|
| JP | 5551914 B2 | 7/2014 |
| JP | 2015-107037 A | 6/2015 |
| JP | 2015-208160 A | 11/2015 |
| JP | 2016-149914 A | 8/2016 |
| WO | WO 2015/019919 A1 | 2/2015 |
| WO | WO 2016/129597 A1 | 8/2016 |
| WO | WO 2017/057317 A1 | 4/2017 |

OTHER PUBLICATIONS

Extended European Search Report issued in European Application No. 17875950.2 dated Jul. 13, 2020 (nine pages).
Mitsuya et al., "A Frequency-Independent Vibrational Energy Harvester Using Symmetrically Charged Comb-Drive Electrodes with Heavily Doped Ion Electrets", Journal of Physics: Conference Series, Nov. 1, 2016, pp. 1-4, vol. 773, XP055704083, five pages.
Hayashi et al., "Electrostatic Micro Transformer using Potassium Ion Electret Forming on a Comb-Drive Actuator", 2013 Transducers & Eurosensors XXVII: The 17$^{th}$ International Conference on Solid-State Sensors, Actuators and Microsystems, IEEE, Jun. 16, 2013, pp. 442-445, XP032499506, four pages.
Suzuki et al., "Electro Micro Power Generator Using Potassium Ion Electret Forming a Comb-drive Actuator", The Proceedings of the Symposium on Micro-Nano Science and Technology, Oct. 21, 2012, pp. 105-106, with English abstract and partial translation, XP055707275, two pages.
International Search Report (PCT/ISA/210) issued in PCT Application No. PCT/JP2017/040800 dated Jan. 23, 2018 with English translation (seven pages).
Japanese-language Written Opinion (PCT/ISA/237) issued in PCT Application No. PCT/JP2017/040800 dated Jan. 23, 2018 (five pages).
Misawa et al., "Reliability of potassium ion electret in silicon oxide for vibrational energy harvester applications", Japanese Journal of Applied Physics, Apr. 30, 2015, pp. 067201-1-067201-5, vol. 54, five pages.

* cited by examiner

VIBRATIONAL ENERGY HARVESTER ELEMENT

TECHNICAL FIELD

The present invention relates to a vibrational energy harvester element.

BACKGROUND ART

Recently, as one energy harvesting technique for harvesting energy from the environment, attention has been directed to a technique for performing generation of power from environmental vibrations by employing a vibrational energy harvester element (i.e. a vibration power generation device). With a vibrational energy harvester element for this sort of application, it has been proposed to utilize electrostatic force due to an electret, in order to obtain high power generation efficiency in a compact manner. In Patent Document 1, for example, there is disclosed an electrostatic induction type conversion element in which electrets are formed upon vertical surfaces of comb-tooth electrodes that are formed as a movable portion and a fixed portion by employing soft X rays.

CITATION LIST

Patent Literature

Patent Document 1: Specification of Japanese Patent 5,551,914.

SUMMARY OF INVENTION

Technical Problem

The electrostatic induction conversion element described in Patent Document 1 performs power generation by a movable portion being vibrated to and fro in a predetermined direction due to environmental vibration. At this time, mechanical work is converted into electrostatic energy by the electrostatic force acting between the comb-tooth electrodes due to the overlapped areas of the opposing electret surfaces of the comb-tooth electrodes changing, so that it is possible to generate electromotive force. However, in order to obtain a larger electromotive force, extra space is required in the direction of vibration of the movable portion, and there is the problem that the electrostatic induction conversion element becomes large.

Solution to Technical Problem

According to the 1st aspect of the present invention, a vibrational energy harvester element comprises: a first electrode; a second electrode that moves in a predetermined direction with respect to the first electrode; a third electrode; a fourth electrode that moves in the predetermined direction with respect to the third electrode; and a support portion that supports the second electrode and the fourth electrode so that they are movable along the predetermined direction; and wherein: the first electrode and the third electrode are disposed along the predetermined direction; at least one of facing surfaces of the first electrode and the second electrode, and at least one of facing surfaces of the third electrode and the fourth electrode, are electrically charged; and the support portion supports the second electrode and the fourth electrode in a state in which electrostatic force between the first electrode and the second electrode, and electrostatic force between the third electrode and the fourth electrode are balanced along the predetermined direction.

According to the 2nd aspect of the present invention, it is preferable that in the vibrational energy harvester element according to the 1st aspect, support rigidity along the predetermined direction is lower than support rigidity along direction different from the predetermined direction, among support rigidities with which the support portion supports the second electrode and the fourth electrode.

According to the 3rd aspect of the present invention, it is preferable that the vibrational energy harvester element according to the 1st or 2nd aspect further comprises a load that is connected to the first electrode and to the third electrode, and wherein the load is driven by electrical power obtained from power generation due to change of electrostatic capacitance caused by relative displacement between the first electrode and the second electrode, and from power generation due to change of electrostatic capacitance caused by relative displacement between the third electrode and the fourth electrode.

According to the 4th aspect of the present invention, it is preferable that in the vibrational energy harvester element according to the 3rd aspect, the load has a value R given by Equation (a) below, in which the electrostatic capacitance of the second electrode or the fourth electrode is $C_0$, and a resonant angular frequency of the second electrode or the fourth electrode is $\omega_0$:

$$R = 2/(C_0 \omega_0) \tag{a}$$

Advantageous Effects of Invention

According to the present invention, it is possible to increase the electromotive force for power generation without increasing the size of the vibrational energy harvester element.

DESCRIPTION OF EMBODIMENTS

Embodiments of the present invention will now be described with reference to the drawings.

Figure 1:
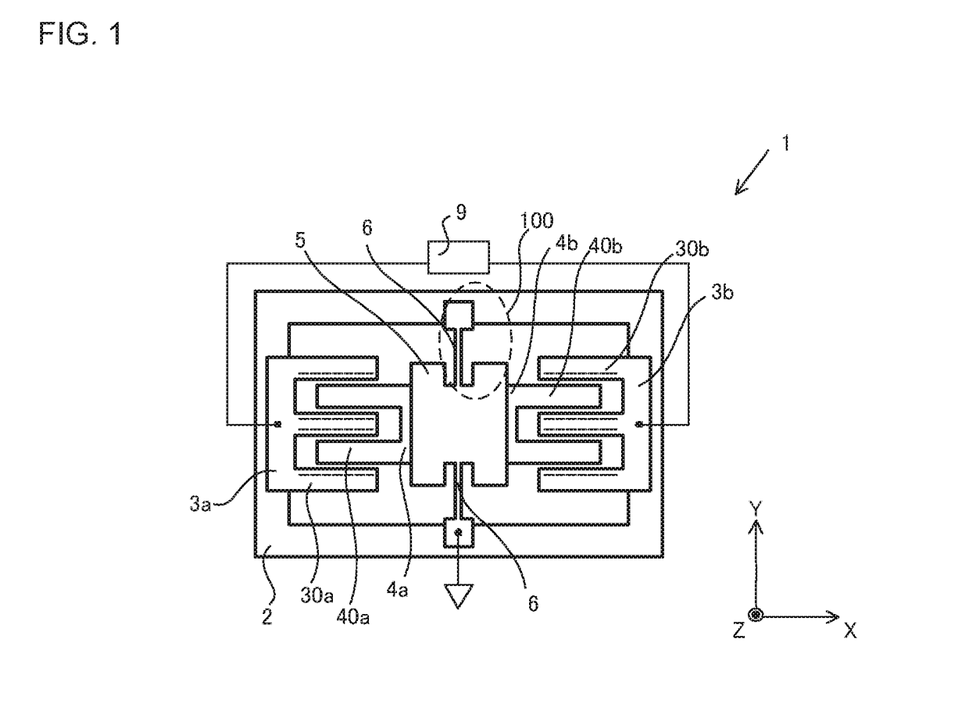
FIG. 1 is a plan view showing the general structure of a vibrational energy harvester element according to an embodiment of the present invention.

FIG. 1 is a plan view showing the general structure of a vibrational energy harvester element 1 according to an embodiment of the present invention. This vibrational energy harvester element 1 may, for example, be formed by a per se conventional MEMS processing technique using, for example, a SOI (Silicon On Insulator) substrate. The SOI substrate may, for example, be produced by layering together a lower Si layer on which a handling layer is formed, a $SiO_2$ layer on which a BOX layer is formed, and an upper Si layer on which a device layer is formed.

The vibrational energy harvester element 1 comprises a base 2, fixed electrodes 3a and 3b, movable electrodes 4a and 4b, a movable portion 5, and elastic support portions 6. A load 9 is connected to the vibrational energy harvester element 1.

In the following explanation, it will be supposed that an orthogonal coordinate system consisting of an X axis, a Y axis, and a Z axis set as shown in FIG. 1 is employed.

The movable portion 5 is movably supported by the elastic support portions 6, which will be described hereinafter. The movable portion 5 comprises the movable electrode 4a at its edge portion in the −X direction and the movable electrode 4b at its edge portion in the +X direction.

The fixed electrodes 3a, 3b and the movable electrodes 4a, 4b all have comb-tooth constructions. A plurality of comb teeth 30a are formed upon the fixed electrode 3a, and a plurality of comb teeth 40a are formed upon the movable electrode 4a. The fixed electrode 3a and the movable electrode 4a are arranged so that the comb teeth 30a and the comb teeth 40a are mutually interleaved on the −X side of the vibrational energy harvester element 1. In a similar manner, a plurality of comb teeth 30b are formed upon the fixed electrode 3b, and a plurality of comb teeth 40b are formed upon the movable electrode 4b. And the fixed electrode 3b and the movable electrode 4b are arranged so that their comb teeth 30b and their comb teeth 40b are mutually interleaved on the +X axis side of the vibrational energy harvester element 1.

As described above, the fixed electrodes 3a, 3b are built as fixed comb-tooth electrodes, and the movable electrodes 4a, 4b are built as movable comb-tooth electrodes. A comb-tooth electrode is a device in which a plurality of comb teeth are arranged in parallel, like the fixed electrodes 3a, 3b and the movable electrodes 4a, 4b of FIG. 1. It should be understood that the numbers of comb teeth in the present invention are not limited to the numbers shown in FIG. 1. When the number of comb teeth is the minimum, two comb teeth are formed upon one of the fixed electrodes, i.e. upon one of the fixed comb-tooth electrode and the movable comb-tooth electrode, and a single comb tooth is formed upon the other electrode and is inserted between those two comb teeth. If the comb-tooth electrodes have this type of basic structure, then, irrespective of the actual number of comb teeth, it is possible to build a vibrational energy harvester element having functions as described below.

The movable portion 5 is elastically supported upon the base 2 by the elastic support portions 6, and can slide to and fro along the X direction as a unit together with the movable electrodes 4a, 4b. In order for the movable portion 5 to move by sliding in the X direction, the elastic support portions 6 are made to have relatively small spring constants k in the X direction, while their spring constants in the Y direction and in the Z direction are made to be relatively large.

Figure 2:
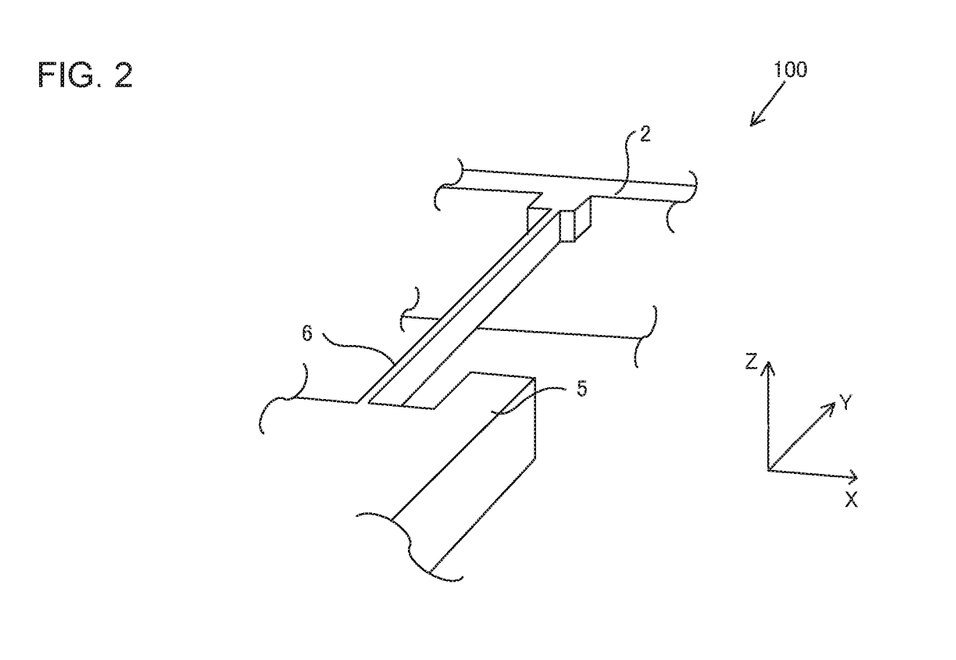
FIG. 2 is a figure schematically showing the structure of an elastic support portion of the vibrational energy harvester element according to the embodiment.

FIG. 2 is a figure schematically showing a structure including a region 100 surrounded in FIG. 1 by a broken line. In the example shown in FIG. 2, an elastic support portion 6 is shaped as an elongated flat plate that extends along the Y direction. The one end portion in the Y direction of the flat plate shaped elastic support portion 6 is connected to the base 2, while its other end portion is connected to the movable portion 5. The thickness (i.e. the length) in the X direction of the flat plate shaped elastic support portion 6 is shorter than its thickness (i.e. its length) in the Z direction.

And the length of the elastic support portion 6 in the Y direction is longer than its thickness (i.e. the length) in the X direction. In other words, the rigidity of the elastic support portion 6 in the X direction is low, as compared to its rigidities in the Y direction and in the Z direction. Accordingly the movable portion 5 principally moves by sliding in the X direction, since the rigidity of the support provided by the elastic support portion 6 to the movable portion 5 in the X direction is lower than the support rigidities that it provides in the Y direction and in the Z direction.

It should be understood that the elastic support portions 6 are not limited to being formed from single members shaped as flat plates as shown in FIG. 2; they could also be formed from a plurality of members shaped as flat plates. And, for example, it would also be acceptable to apply the construction described in Japanese Patent 5,551,914 for the elastic support portions 6.

Furthermore, the elastic support portions 6 are not limited to being flat in shape, in other words to having rectangular cross sections in ZX planes; these cross sections could be elliptical, or circular, or polygonal. In this case, by forming the elastic support portions 6 so that the maximum lengths of their cross sections in the X direction are shorter than their lengths in the Z direction, it would be possible to make their support rigidities in the X direction be lower than their support rigidities in the other directions.

Electrets are formed in the neighborhood of at least one of the respectively confronting surfaces of the comb teeth 30a of the fixed electrode 3a and the comb teeth 40a of the movable electrode 4a which are interleaved together, and the comb teeth 30b of the fixed electrode 3b and the comb teeth 40b of the movable electrode 4b which are interleaved together. Due to this, at least one of the mutually confronting surfaces of the fixed electrode 3a and the movable electrode 4a, and the mutually confronting surfaces of the fixed electrode 3b and the movable electrode 4b, become electrically charged. In this embodiment, electrets that have substantially the same electrical charging voltage are formed upon at least one of the respectively confronting surfaces of the fixed electrode 3a and the movable electrode 4a, and on at least one of the respectively confronting fixed electrode 3b and the movable electrode 4b. Due to this, the electrostatic force of the electrets acting upon the −X side edge portion of the movable portion 5 and the electrostatic force of the electrets acting upon its +X side edge portion are supported by the elastic support portions 6 in a balanced state. In other words, when the movable portion 5 vibrates to and fro in the X direction, the position at the center of this vibration is the point where the elastic support portions 6 stabilize. It should be understood that it would also be possible to arrange for the vibration center position to be positioned within a predetermined permitted range that is set according to the results of testing or the like, taking the stable point where the elastic support portions 6 stabilize as a reference, It should be understood that the electrostatic voltages are not limited to being precisely the same; it will be sufficient for the electrostatic forces acting upon the movable portion 5 to be in a balanced state as described above, in other words for the electrostatic forces to be such that it is possible to implement positioning of the vibration center position at a position of the stable point of the elastic support portions 6. Moreover, as one example of a method of forming the electrets, as for example described in Japanese Laid-Open Patent Publication 2016-149914, a method may be employed of performing high temperature bias treatment in which oxide layer films are formed upon the surfaces of the comb-tooth construction, or the like. Of course the method described above is not limitative; it would also be possible to apply methods of various other types, such as for example the method disclosed in Japanese Patent Specification 5,551, 914 or the like.

The load 9 may, for example, be the input impedance of a power supply controller that regulates voltage and polarity, and that consumes power supplied from the vibrational energy harvester element 1 in order to perform some predetermined operation. The positive electrode side of the load 9 is connected to the fixed electrode 3a, and its negative electrode side is electrically connected to the fixed electrode 3b. It should be understood that it would also be acceptable for the negative electrode side of the load 9 to be connected to the fixed electrode 3a and for its positive electrode side to be connected to the fixed electrode 3b.

When the vibrational energy harvester element 1 is oscillated by a vibration in the environment in a direction that includes the X direction, the movable electrodes 4a, 4b are vibrated and are displaced to and fro in the X direction with respect to the fixed electrodes 3a, 3b. For example, when the movable electrodes 4a, 4b are displaced toward the +X side, the area of opposition between the fixed electrode 3a and the movable electrode 4a decreases, while the area of opposition between the fixed electrode 3b and the movable electrode 4b increases. The electric charges induced in the electrets change due to this type of change of the areas of opposition. And the vibrational energy harvester element 1 performs power generation by electromotive force being generated due to the changes of voltage between the fixed electrodes 3a, 3b and the movable electrodes 4a, 4b. The electromotive force obtained due to this power generation by the vibrational energy harvester element 1 is applied to the load 9 via the electrical connections described above, and the load 9 is driven thereby.

The movement of the movable electrodes 4a, 4b of the vibrational energy harvester element 1 having the structure described above will now be explained.

Figure 3:
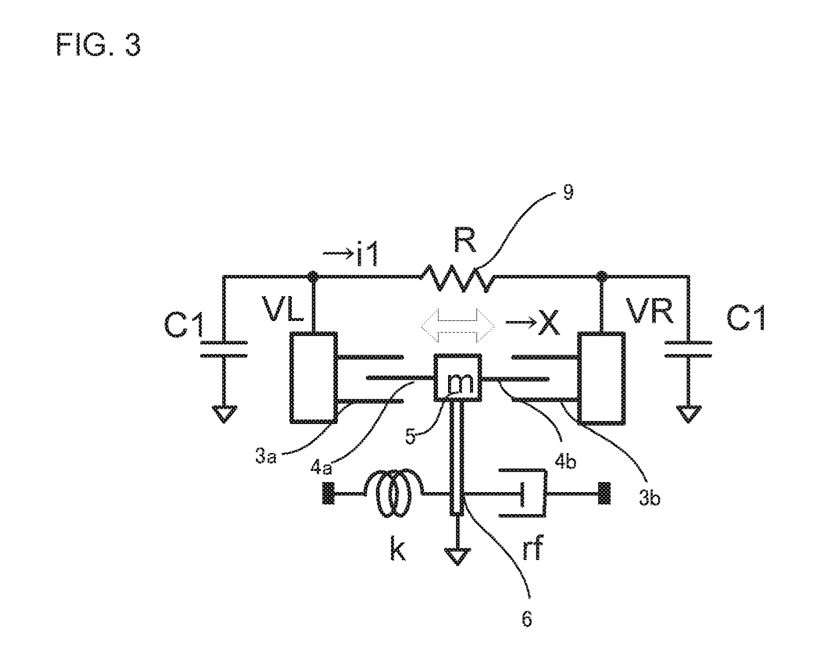
FIG. 3 is a figure showing an equivalent circuit diagram of the vibrational energy harvester element according to the embodiment shown in FIG. 1.

FIG. 3 is an equivalent circuit diagram corresponding to the structure of the vibrational energy harvester element 1 shown in FIG. 1. By employing this equivalent circuit, it is possible to express the equation of motion of the movable portion 5 when the movable portion 5 vibrates along the X direction as in the following Equation (1):

[Math. 1]

$$m\ddot{X} = -m\ddot{X}_{OUT} - kX - r_f \dot{X} - \frac{A}{2V_0}(V_L - V_0)^2 + \frac{A}{2V_0}(V_R - V_0)^2 \quad (1)$$

In this Equation, m is the mass of the movable portion 5, X is the relative displacement of the movable portion 5 with respect to some fixed portion of the vibrational energy harvester element 1 (for example, the fixed electrodes 3a, 3b), $X_{OUT}$ is the displacement of the external vibration of the vibrational energy harvester element 1, $r_f$ is the damping coefficient due to air and mechanical friction, $V_L$ and $V_R$ are the voltages generated by the fixed electrodes 3a, 3b, and $V_0$ is the electret electrostatic voltage upon the fixed electrodes 3a, 3b. Moreover, A is a force factor representing the amounts of force due to the electrets, and may be given by the following Equation (2).

$$A = 2n\varepsilon_0 b V_0/g \quad (2)$$

Here, n is the number of the comb teeth 30a or 40a, $\varepsilon_0$ is the permittivity of the vacuum, b is the thickness of the comb teeth 30a, 40a (i.e. their length in the Z direction), $V_0$ is the electrostatic voltage of the electrets, and g is the gap between the comb teeth 30a and the comb teeth 40a. As shown by Equation (2), in order to change the value of the force factor A, in other words in order to change the intensity of the effect of the electrets, it will be sufficient to change at least one of the gap g between the comb teeth 30a and 40a, and the electrostatic voltage $V_0$ of the electrets. For example, it is possible to change the value of the force factor A to be larger by reducing the gap g, or by increasing the electrostatic voltage $V_0$, or by performing both of these.

The first term on the right side of Equation (1) represents the force that external vibration of the vibrational energy harvester element 1 exerts upon the movable portion 5, the second term represents the elastic force acting upon the movable portion 5 due to the elastic support portions 6, and the third term represents the force that air friction and mechanical friction and so on exert upon the movable portion 5. Moreover, the fourth term represents the electrostatic force acting upon the movable electrode 4a, and the fifth term represents the electrostatic force acting upon the movable electrode 4b. Equation (4) is obtained by approximating Equation (1) by setting the value of the load 9 to the optimum value R given by the following Equation (3), and under the condition that the external vibration is a sine wave whose frequency is in the neighborhood of the resonant frequency of the movable portion 5.

$$R = 2/(C_0 \omega_0) \quad (3)$$

[Math. 2]

$$m\ddot{X} = -m\ddot{X}_{OUT} - \left(k + \frac{A^2}{C_0}\right)X - \left(r_f + \frac{A^2}{C_0 \omega_0}\right)\dot{X} \quad (4)$$

Here, $C_0$ is the electrostatic capacitance of the movable electrode 4a or 4b, and $\omega_0$ is the resonant angular frequency of the movable portion 5, in other words the resonant angular frequency of the movable electrode 4a or 4b. Taking the length in the X direction when the fixed electrodes and the movable electrodes are opposing one another as being w and the floating capacitance as being $C_1$, then the electrostatic capacitance $C_0$ is given by $C_0 = C_1 + (2n\varepsilon_0 bw/g)$, and the resonant angular frequency $\omega_0$ is given by $\omega_0 = \{(k+A^2/C_0)/m\}^{1/2}$. Equation (3) represents the resistance value for the load 9 to have that is set as an optimum value R when the time constant of the electrostatic capacitance of the fixed electrode and the movable electrode and discharge by the load 9, and the time constant of the vibration of the movable portion 5, agree with one another.

As shown on the right side of Equation (4), the force acting upon the movable portion 5 can be classified into the force from external vibration, the force in the second term on the right side due to the hard spring effect due to the electrets (hereinafter termed the "hard spring term"), and the force in the third term on the right side due to the effect of electrical damping (hereinafter termed the "electrical damping term"). If the force factor A shown in Equation (2) is changed, then it is possible to change the value of the hard spring term $(k+A^2/C_0)$ and the value of the electrical damping term $(r_f+A^2/(C_0\omega_0))$. As described above, it is possible to change the force factor A if at least one of the interval g between the comb teeth 30a and 40a and the electret charged voltage $V_0$ is changed. Accordingly, it is possible to change the value of the hard spring term and the value of the electrical damping term by changing at least one of the interval g between the comb teeth 30a and 40a and the electret charged voltage $V_0$.

The electrical damping term included in Equation (4) depends upon the bandwidth of the vibration of the movable portion 5. It is possible to set the resonant Q value of the vibration frequency responsiveness of the movable portion 5 to any desired value by varying the electrical damping term by changing the force factor A. The overall Q value is given by the following Equation (5), in which the Q value due to the mechanical damping is termed $Q_M$ and the Q value due to the electrical damping is termed $Q_e$

[Math. 3]

$$Q = \frac{1}{\frac{1}{Q_M} + \frac{1}{Q_e}} = \frac{1}{\frac{1}{Q_M} + \frac{A^2}{C_0\omega_0}} \cong 1 + \frac{C_0 k}{A^2} \quad (5)$$

(when $Q_M \gg 1$)

As shown in Equation (5), if the force factor A is set to a high value, it becomes possible to lower the value of Q to a low value. And, the lower is the Q value, the smoother the peak of the resonance becomes, so that it is possible simply and easily to perform matching of the resonant frequency of the movable portion 5 to the frequency of the external vibration. In other words, even without the interior of the vibrational energy harvester element 1 being maintained at a high vacuum, power generation is performed by causing the movable portion 5 to resonate with respect to the applied external vibration over a wide band and electrical power is outputted from the fixed electrodes 3a, 3b.

In this case, the output power P from the fixed electrodes 3a, 3b is given by the following Equation (6):

[Math. 4]

$$P = \frac{1}{2} m \omega_0^3 X_{OUT} X_0 \left( \frac{1}{1 + \frac{C_0 k}{A^2 Q_M}} \right) \quad (6)$$

The greater is the value of the force factor A, the closer the value of $\{1/(1+C_0k/(A^2Q_M))\}$, which is the power generation efficiency $E_H$ in Equation (6) above, becomes to 1, so that it becomes possible to ignore the influence of mechanical damping. In other words, by setting the value of the force factor A to a large value, it is possible to set the Q value to a low value without increasing the mechanical damping, so that it is possible to enhance the power generation characteristic by suppressing losses due to increase of the mechanical damping. In the case of this embodiment, by setting the value of the force factor A to be high, it is possible to increase the power generation efficiency due to the vibrational energy harvester element 1, since it is possible to adapt the construction so that the effects due to electrical damping outmatch the effects due to mechanical damping.

The hard spring term in Equation (4) depends upon the resonant frequency. It is possible to change the resonant frequency of the movable portion 5 by changing the force factor A and thus changing the hard spring term. In general, the resonant frequency of the movable portion 5 is determined by its mechanical mass and by the spring constants k of the elastic support portions 6. By contrast since, with the vibrational energy harvester element 1 of the present embodiment, the hard spring effect is generated due to the electrostatic force of the electrets, accordingly it is possible to change the resonant frequency by adjusting the force factor A by adjusting the voltage $V_0$. In this manner, it is possible to manufacture a vibrational energy harvester element 1 with which it is possible to vary the resonant frequency so as to be appropriate for the frequency of external vibration.

Figure 4:
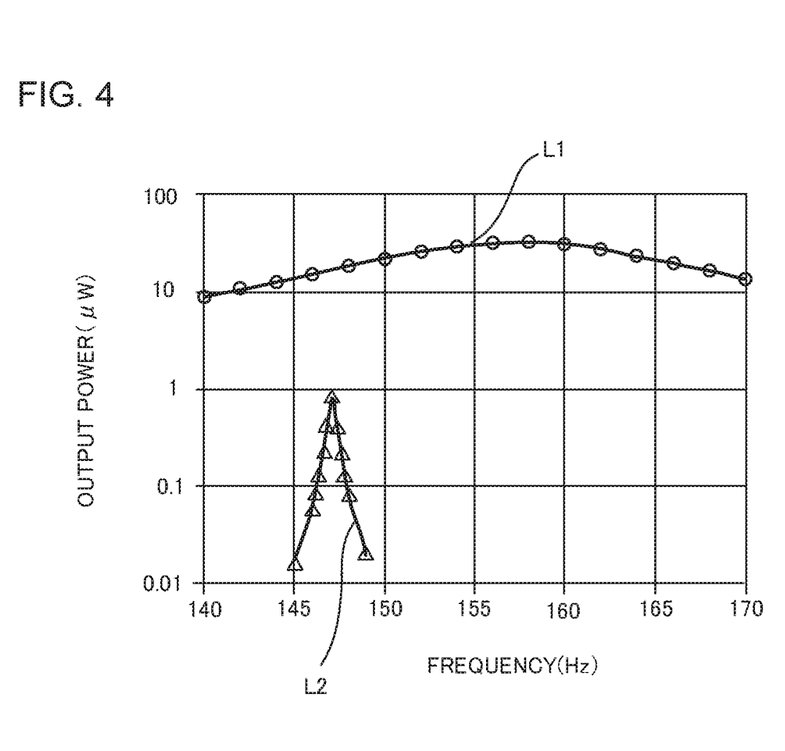
FIG. 4 is a figure showing results of simulation.

FIG. 4 is a figure showing the results of simulation of this vibrational energy harvester element 1. In this simulation, it is supposed that there is no mechanical damping (in other words, that $r_f=0$), that the value of the load 9 is the optimum value R given by Equation (3), that sine wave vibration is applied to the vibrational energy harvester element 1, and that the maximum amplitude of the movable portion 5 is 200 [μm]. In FIG. 4, the output power [μW] is shown along the vertical axis and the frequency [Hz] is shown along the horizontal axis, the relationship between the frequency and the output power under first conditions to be described hereinafter is shown by the line L1, and the relationship between the frequency and the output power under second conditions to be described hereinafter is shown by the line L2.

The first conditions are as follows:
Electrostatic voltage $V_0$ of electret=300 [V].
Force factor A=13.5 [μC/m].
Optimum value R of load 9=18.37 [MΩ].
Acceleration 24.6 [m/s²].
Q value=7.9.

The second conditions are as follows:
Electrostatic voltage $V_0$ of electret=50 [V].
Force factor A=2.25 [μC/m].
Optimum value R of load 9=19.62 [MΩ].
Acceleration 0.685 [m/s²].
Q value=250.

With the first conditions described above, the value of the force factor A is set to a larger value as compared to the case with the second conditions; in other words, the Q value given by Equation (5) is set to a smaller value. As shown in FIG. 4, in the line L2 relating to the second conditions where the Q value is larger, the peak of the resonance is sharp. As shown by this line L2, at the resonant frequency, the movable portion 5 reaches its maximum amplitude even upon receipt of small external vibrations, but the output electrical power becomes small. By contrast, in the line L1 relating to the first conditions where the Q value is lower, as described above, the peak of the resonance becomes smooth. And, as shown by this line L1, the movable portion 5 reaches its maximum amplitude upon receipt of comparatively large external vibrations, so that the output electrical power becomes great. Moreover, comparing the line L1 and the line L2, it is seen that it is possible for the fixed electrodes 3a, 3b to generate power over a broad frequency band. Furthermore, the resonant frequencies are different for the lines L1 and L2 for which the force factors A are different; that is, the resonant frequency for the line L1 is increased due to the hard spring effect described above. In other words, it becomes possible to change the resonant frequency to be suitable for the frequency of the external vibrations by adjusting the force factor A as described above.

According to the embodiment described above, the following beneficial operational effects are obtained.

(1) At least one of the mutually confronting surfaces of the fixed electrode 3a and the movable electrode 4a is electrically charged, and at least one of the mutually confronting surfaces of the fixed electrode 3b and the movable electrode 4b is electrically charged. And the elastic support portions 6 support the movable electrodes 4a, 4b so that the electrostatic force due to the fixed electrode 3a and the movable electrode 4a and the electrostatic force due to the fixed electrode 3b and the movable electrode 4b are in a mutually balanced state along the X direction.

In this embodiment, the force factor A is set to a large value, as in the case of the first conditions for the simulation described above. In other words, the vibrational energy harvester element 1 is built so that the electrostatic voltage $V_0$ of the electrets in Equation (2) is set to a large value and the gap g between the comb teeth 30a and the comb teeth 40a becomes small.

Generally, when the electret electrostatic voltage $V_0$ is set to a high value, the electrostatic force also becomes high. For example, with a vibration element having a structure such as that disclosed in Japanese Laid-Open Patent Publication 2016-149914, when the electrostatic force becomes high, the amount of movement of the movable comb-tooth electrode in the X direction also becomes high. Due to this, a considerable amount of space in the X direction is required for movement of the movable comb-tooth electrode. Furthermore, since there is a possibility that the amount of flexing of the elastic support portion may become great and that the elastic support portions may suffer damage, accordingly a structure is required that is capable of preventing damage to the elastic support portions due to a large amount of flexing. Therefore it is necessary to provide a shape for the vibration element that is also quite extensive in the Y direction.

By contrast, with the vibrational energy harvester element 1 of this embodiment, the movable portion 5 is supported by the elastic support portions 6 with the electrostatic forces in a mutually balanced state. In other words, since, even while the movable portion 5 is vibrating, the vibration center position is positioned at the position of the stable point, accordingly there is no requirement to provide a great deal of space along the X direction, and also no structure is required for preventing damage to the elastic support portions 6. Due to this, it is possible to make the value of the force factor A high and to increase the amount of power generated, without increasing the size of the vibrational energy harvester element 1. To put it in another manner, as compared to a prior art type vibration element of the same size, it is possible to manufacture a vibrational energy harvester element 1 that is capable of generating a greater amount of power.

Furthermore, due to the movable portion 5 being supported by the elastic support portions 6 with the electrostatic forces in a balanced state, even if the force acting upon the movable portion 5 due to the applied vibration does not exceed the predetermined force due to the electrostatic force of the electret, it is still possible for vibration to be started by minute external vibrations with the movable portion 5 being positioned in the vibration center position. In particular, if the external vibration and the resonant frequency coincide with one another, then it becomes possible for the movable portion 5 to be vibrated largely by resonance. In other words, it becomes possible to perform power generation, even in a case in which the external vibration that is applied to the vibrational energy harvester element 1 is minute.

Yet further, as compared with a prior art type power generation element that responds to impulsive environmental vibration, the vibrational energy harvester element 1 of this embodiment is capable of detecting feeble sine wave type environmental vibration, for example the feeble vibration of a pump or a fan or the like. Since in this case the frequency fluctuates depending upon the load, accordingly a vibrational energy harvester element 1 of this embodiment that has a wide band characteristic may appropriately be employed.

Even further, since the movable portion 5 is supported by the elastic support portions 6 with the electrostatic forces in a mutually balanced state, accordingly it is possible to set the electret electrostatic voltage $V_0$ to a high value, and due to this, it becomes possible to manufacture a vibrational energy harvester element 1 with which the speed of conversion from mechanical energy to electrical energy is great. Due to it being possible to increase the electret electrostatic voltage $V_0$, it becomes possible to arrange for the force factor A shown in Equation (2) described above to have a large value, and accordingly it is possible to lower the Q value as shown in Equation (5) without increasing the mechanical damping. And, due to this, it is possible to implement a vibrational energy harvester element 1 having a wide band characteristic as shown by the line L1 in FIG. 4, so that frequency matching between the resonant frequency of the vibrational energy harvester element 1 and the frequency of the external vibration becomes simple and easy, and it is possible to enhance the power generation efficiency.

Still further, by adjusting the electret electrostatic voltage $V_0$ and thus varying the value of the force factor A, it is possible to manufacture a vibrational energy harvester element 1 having a resonant frequency that is matched to the frequency of the external vibration.

(2) Among the various support rigidities of the elastic support portions 6 that support the movable electrodes 4a, 4b, their support rigidities along the X direction are smaller than their support rigidities along directions different from the X direction (for example, their support rigidities along the Y direction and the Z direction). Due to this, the elastic support portions 6 are capable of supporting the movable portion 5 so that the movable portion 5 can move by sliding in the X direction, and so that the movable portion 5 can vibrate without the vibration center position of the movable portion 5 being moved at the position of the stable spring point.

(3) The load 9 is connected to the fixed electrodes 3a, 3b, and is driven by electrical power obtained from power generation due to change of electrostatic capacitance caused by relative displacement between the fixed electrode 3a and the movable electrode 4a, and from power generation due to change of electrostatic capacitance caused by relative displacement between the fixed electrode 3b and the movable electrode 4b. Due to this, as compared for example with the case of a prior art type power generation element having the structure described in Japanese Laid-Open Patent Publication 2016-149914, the vibrational energy harvester element 1 of this embodiment is capable of providing around twice the electrical power totally from the fixed electrodes 3a, 3b. Accordingly it is possible to increase the amount of generated power to be supplied to the load 9, without increasing the size of the vibrational energy harvester element 1. To put this in another manner, as compared to the case of a prior art type vibration element having the same size, it is possible to provide a vibrational energy harvester element 1 that provides a greater amount of generated power.

The structure of the vibrational energy harvester element according to the present invention is not limited to that of the embodiment described above. For example although, in FIG. 1, as an example, a case was disclosed in which each of the plurality of comb teeth 30a of the fixed electrode 3a and each of the plurality of comb teeth 30b of the fixed electrode 3b were formed along the X direction, this should not be considered as being limitative.

Figure 5:
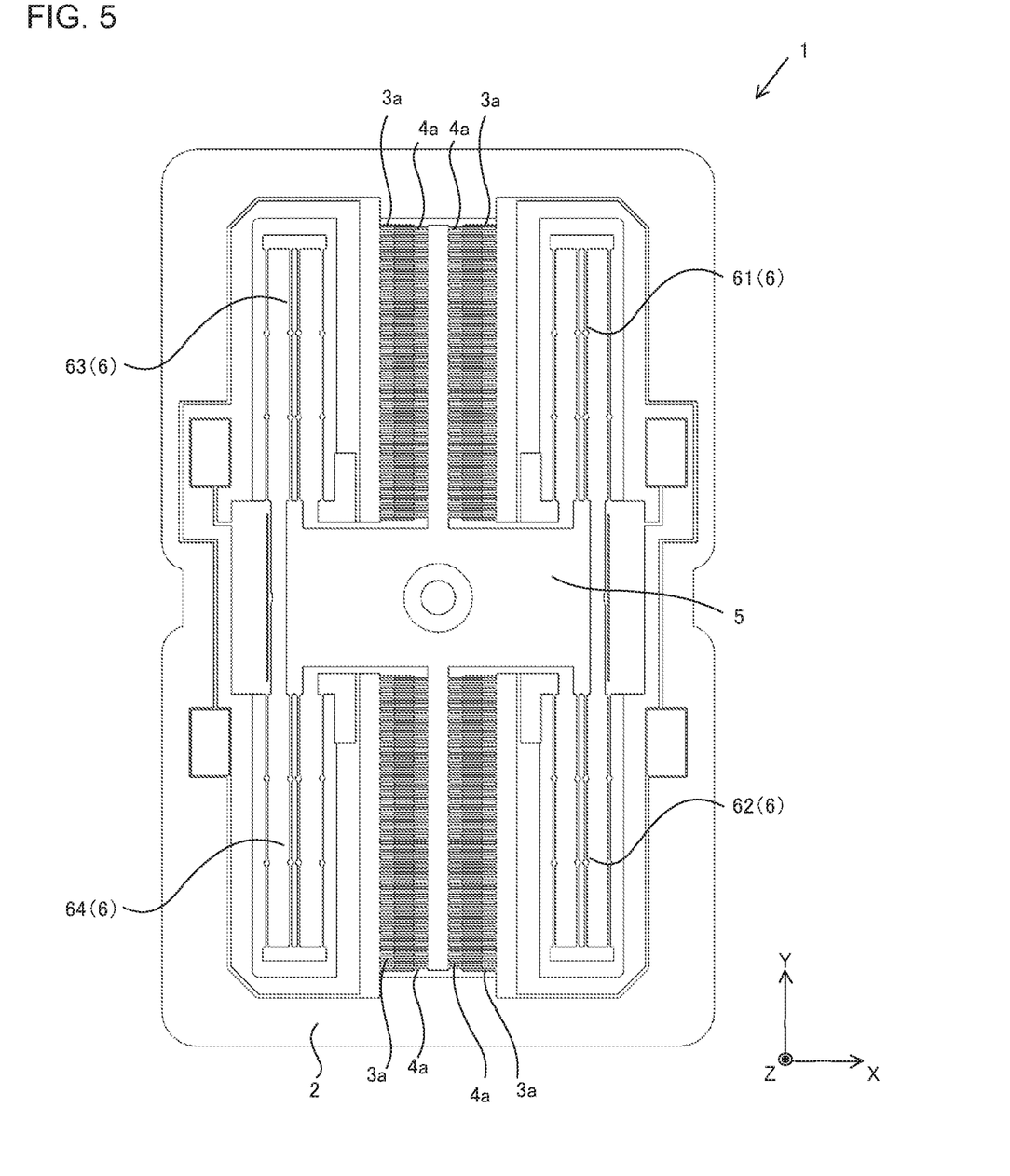
FIG. 5 is a plan view showing the structure of an elastic support portion of a vibrational energy harvester element according to a variant embodiment.

Furthermore while, with the vibrational energy harvester element 1 explained in terms of the embodiment shown in FIG. 1, the elastic support portions 6 supported the movable portion 5 at two spots, in the −Y direction and in the +Y direction, it would also be acceptable for the movable support portion to be supported by elastic support portions 6 at three or more spots. For example, in FIG. 5, a case is shown by way of example in which, in the XY plane, the movable portion 5 is supported by elastic support portions 6 at four spots. In this case, at the neighborhood of its end portion on the +X direction side, the movable portion 5 is supported by a first elastic support portion 61 from the +Y direction, and is supported by a second elastic support portion 62 from the −Y direction. Moreover, at the neighborhood of its end portion on the −X direction side, the movable portion 5 is supported by a third elastic support portion 63 from the +Y direction, and is supported by a fourth elastic support portion 64 from the −Y direction.

Figure 6:
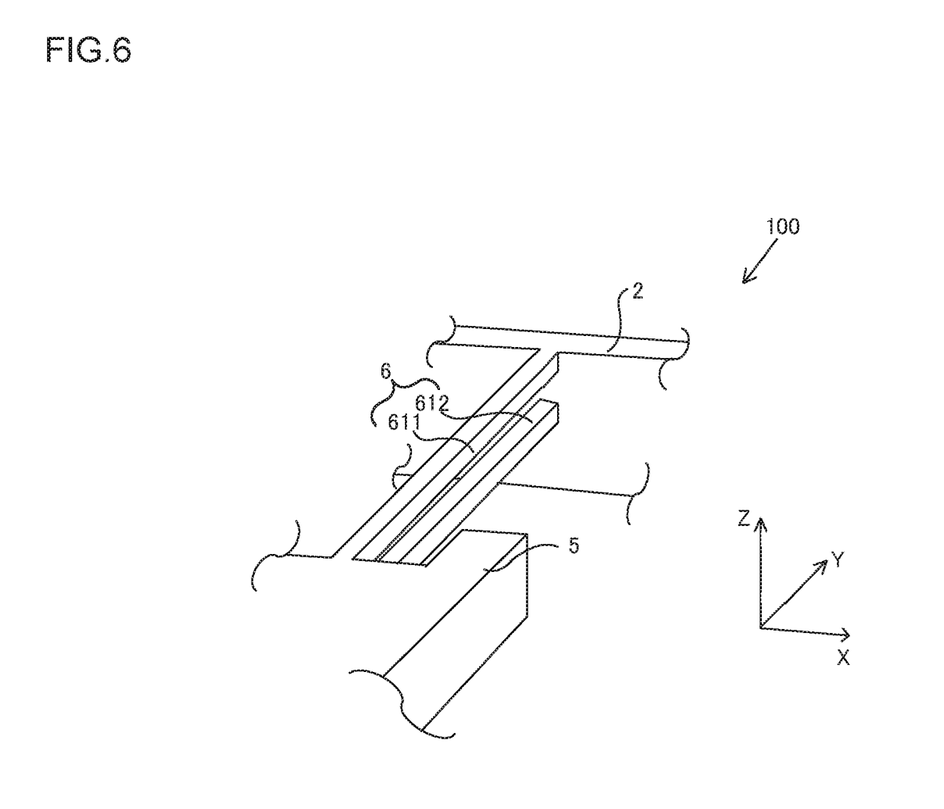
FIG. 6 is a figure schematically showing the structure of an elastic support portion of a vibrational energy harvester element according to another variant embodiment.

Yet further while, in the explanation of the vibrational energy harvester element 1 of the above embodiment, an example was described in which the support rigidity in the X direction provided by the elastic support portions 6 was made lower by providing them with appropriate cross sectional shapes, this is not limitative. For example, the vibrational energy harvester element 1 may be built with a plurality of elastic support portions 6 that extend along the Y direction being arranged along the Z direction. An example of this type of construction is shown in FIG. 6. FIG. 6 is a figure schematically showing a construction included in the region 100 of FIG. 1, in a similar manner to FIG. 2. In the example shown in FIG. 6, the vibrational energy harvester element 1 comprises two plate shaped elastic support portions 6 extending in the Y direction (subsequently these will be referred to as the "upper elastic support portion 611" and the "lower elastic support portion 612"). The one end portions in the Y direction of the upper elastic support portion 611 and the lower elastic support portion 612 are connected to the base 2, and their other end portions are connected to the movable portion 5. In this case, the upper elastic support portion 611 and the lower elastic support portion 612 are arranged as stacked along the Z direction. Due to this, the rigidity along the Z direction is provided by the two elastic support portions 6. Accordingly, with this vibrational energy harvester element 1, the support rigidity in the X direction can be made to be lower than the support rigidities in other directions. It should be understood that this vibrational energy harvester element 1 is not limited to having two elastic support portions 6, i.e. the upper elastic support portion 611 and the lower elastic support portion 612; it could also have three or more such elastic support portions 6.

Even further, the construction of the elastic support portions 6 is not limited to the case of plate shaped members. For example, it would also be acceptable to arrange for the movable portion 5 to be supported by coil springs. In this case, the movable portion 5 is connected to the base 2 via coil springs in each of the X direction, the Y direction, and the Z direction. And, by making the spring constants of the coil springs connected to the movable portion 5 in the Y direction and in the Z direction be greater than the spring constants of the coil springs connected thereto in the X direction, it is possible to ensure that the support rigidity for the movable portion 5 in the X direction is lower. In this case, for example, the number of coil springs connected to the movable portion 5 in the Y direction and in the Z direction may also be made to be greater than the number of coil springs connected thereto in the X direction.

Provided that the essential characteristics of the present invention are preserved, the present invention is not to be considered as being limited to the details of the embodiments described above; other variations that are considered to come within the range of the technical concept of the present invention are also included within the scope of the present invention.

The content of the disclosure of the following application, upon which priority is claimed, is hereby installed herein by reference.

Japanese Patent Application 231,879 of 2016 (filed on 29 Nov. 2016).

REFERENCE SIGNS LIST

1: vibrational energy harvester element
2: base
3a, 3b: fixed electrode
4a, 4b: movable electrode
5: movable portion
6: elastic support portion
9: load
30a, 30b: comb teeth
40a, 40b: comb teeth

The invention claimed is:
1. A vibrational energy harvester element, comprising:
a first electrode;
a second electrode that moves in a predetermined direction with respect to the first electrode;
a third electrode;
a fourth electrode that moves in the predetermined direction with respect to the third electrode;
a support portion that supports the second electrode and the fourth electrode so that they are movable along the predetermined direction; and
a load that is connected to the first electrode and to the third electrode,
wherein
the first electrode and the third electrode are disposed along the predetermined direction,
at least one of facing surfaces of the first electrode and the second electrode, and at least one of facing surfaces of the third electrode and the fourth electrode, are electrically charged,
the support portion supports the second electrode and the fourth electrode in a state in which electrostatic force between the first electrode and the second electrode, and electrostatic force between the third electrode and the fourth electrode are balanced along the predetermined direction,
the load is driven by electrical power obtained from power generation due to change of electrostatic capacitance caused by relative displacement between the first electrode and the second electrode, and from power generation due to change of electrostatic capacitance caused by relative displacement between the third electrode and the fourth electrode,
the load that is connected to the first electrode and to the third electrode has a resistance R, and
a voltage of the electrically-charged electrode facing surfaces, a gap between the first and second electrodes, a gap between the third and fourth electrodes, a resonant frequency of the movement of the second electrode or the fourth electrode, and the resistance

R are such that $R=2/(C_0\omega_0)$, where $C_0$ is an electrostatic capacitance of the second electrode or the fourth electrode and $\omega_0$ is a resonant angular frequency of the second electrode or the fourth electrode.

2. The vibrational energy harvester element according to claim 1, wherein, supportrigidity along the predetermined direction is lower than support rigidity along direction different from the predetermined direction, among support rigidities with which the support portion supports the second electrode and the fourth electrode.

\* \* \* \* \*